United States Patent [19]
Leung

[11] Patent Number: 6,115,142
[45] Date of Patent: Sep. 5, 2000

[54] METHOD AND APPARATUS FOR SUPPORTING ANALOG FAX CALLS IN A TANDEM CONFIGURATION

[75] Inventor: Nikolai K. N. Leung, San Diego, Calif.

[73] Assignee: Qualcomm Incorporated, San Diego, Calif.

[21] Appl. No.: 08/956,178

[22] Filed: Oct. 22, 1997

Related U.S. Application Data

[60] Provisional application No. 60/054,640, Aug. 4, 1997.

[51] Int. Cl.[7] ............................................. H04N 1/00
[52] U.S. Cl. .............................. 358/434; 358/442
[58] Field of Search ............. 379/100.01, 100.09, 379/100.12, 100.15; 358/400, 401, 407, 434, 435, 436, 437, 468, 439, 442

[56] References Cited

U.S. PATENT DOCUMENTS

| | | | |
|---|---|---|---|
| 5,121,391 | 6/1992 | Paneth | 370/95.1 |
| 5,172,246 | 12/1992 | Yoshida | 358/406 |
| 5,237,429 | 8/1993 | Zuiss | 358/442 |
| 5,263,078 | 11/1993 | Takahashi | 379/58 |
| 5,282,238 | 1/1994 | Berland | 379/58 |
| 5,369,501 | 11/1994 | Wilson | 358/407 |
| 5,487,175 | 1/1996 | Bayley et al. | 455/54.2 |
| 5,509,050 | 4/1996 | Berland | 379/58 |
| 5,752,199 | 5/1998 | Scott | 455/557 |

FOREIGN PATENT DOCUMENTS

| | | | |
|---|---|---|---|
| 0594185 | 10/1993 | European Pat. Off. | H04N 1/32 |
| 0724355 | 3/1996 | European Pat. Off. | H04N 1/333 |
| 0708549 | 4/1996 | European Pat. Off. | H04N 1/327 |
| 9209157 | 5/1992 | WIPO | H04L 5/14 |

OTHER PUBLICATIONS

McDonnell; Facsimile Handbook, pages (specific pages unknown but see chapter 3); 1992.

"Real–Time Transmission of Group 3 Facsimile Over Interconnected Public Switched Digital Mobile Satellite Networks" by Dimolitsas et al.; 8276 Comsat Technical Review 1992, pp. 125–145.

*Primary Examiner*—Jerome Grant, II
*Attorney, Agent, or Firm*—Philip R. Wadsworth; Kyong H. Macek

[57] ABSTRACT

The present invention provides an apparatus and method for supporting analog fax calls between two wireless subscriber stations in a tandem configuration. The existence of a tandem configuration is detected, and a more efficient communication protocol is established between two base stations upon detection of the tandem configuration. A message generator in a first base station generates an identification message. If the identification message is received by a second base station, the second base station will be informed that the tandem configuration exists. A message generator in a second base station may then generate a return message, which when received by the first base station, will notify the first base station of the existence of the tandem configuration. To support the tandem configuration, full duplex communication may be established between the two base stations. Full duplex communication may be realized by incorporating an echo canceler in the base station, or by utilizing both BFSK channels of the V.21 fax system for communication. The tandem configuration may also be supported by advanced flag synchronization. Thus, after a message is transmitted from a first base station to a second base station, the second base station will immediately start sending preamble flags to the first base station. The first base station may then synchronize its receiver for immediate receipt of the return message from the second base station.

4 Claims, 4 Drawing Sheets

METHOD AND APPARATUS FOR SUPPORTING ANALOG FAX CALLS IN A TANDEM CONFIGURATION

This Appln claims benefit of provisional application Ser. No. 60/054,640 filed Aug. 4, 1997.

BACKGROUND OF THE INVENTION

I. Field of the Invention

The present invention relates to data communications. More particularly, the present invention relates to an apparatus and method for supporting analog fax calls between two wireless subscriber stations in a tandem configuration.

II. Description of the Related Art

In a fax communication system, two fax machines generally communicate with each other through a standard public switched telephone network (PSTN) channel. A digital communication system or satellite link may be incorporated within the fax system to extend the range of coverage, allow mobility for the communicating devices, and increase interconnectivity between different communicating devices. An exemplary digital communication system which can be used in conjunction with a fax communication system is a terrestrial wireless system or a satellite communication system.

In wireless mobile and wireless local loop networks, a tandem configuration is established when calls from one wireless subscriber to another wireless subscriber are routed through the PSTN. A fax machine may be connected to each of the wireless subscribers. In this configuration, the base station is generally unaware that it is communicating with another base station across the PSTN.

The tandem configuration may be necessary for several reasons. First the base station communicating with one subscriber may not be aware that the other subscriber is also a wireless subscriber. Thus, the second base station is necessary for providing a link to the other subscriber. Also, two base stations may be necessary because the two wireless subscribers may not be located in the same coverage area of any one base station. Further, for billing purposes, the call should pass through the PSTN, which contains the billing center.

Although necessary for connecting two wireless subscribers, tandem configurations cause degradation in performance. For voice calls, voice quality is degraded due to the multiple encoding and decoding which occurs as the speech signal is passed from the subscriber unit to the base station to the receiving base station and the receiving subscriber unit. For fax calls, the processing between the two base stations degrades performance by adding errors and delays.

When two fax machines communicate directly through a standard PSTN channel, channel quality and delay characteristics are well known and manageable. However, in a tandem configuration, processing delays result from the large amount of digital signal processing and from transmission delays. Further delays are incurred as the base stations combine or multiplex signals from many communicating devices into a common transmission signal. The resultant overall delay can be both intolerably long and unpredictable.

The source of the delay and the problems associated with the delay will be better appreciated through an understanding of the processing associated with a fax call. For a standard Group 3 fax communication system, the timing and synchronization between fax machines conform to behavior as specified in "ITU-T Recommendation T.30: Procedures for Document Facsimile Transmission in the General Switched Telephone Network," hereinafter referred to as the T.30 fax protocol, and incorporated by reference herein. The T.30 fax protocol uses a number of modulation techniques for transmission of forward message data. In particular, parameter negotiation and handshaking between fax machines is accomplished using the modulation technique specified in "CCITT Recommendation V.21: 300 bps Duplex Modem Standard for use in the General Switched Telephone Network (GSTN)" hereinafter referred to as V.21, and also incorporated by reference herein. The handshaking establishes the proper mode of communications between the fax machines.

For a T.30 fax system, V.21 messages are sent between a calling fax machine and a called fax machine in establishing a call. A calling fax machine initiates a call by dialing the called fax machine and sending a calling tone (CNG). The called fax machine detects the incoming call and sends a called station identification tone (CED) back to the calling fax machine. The called fax machine then sends its digital identification signal (DIS) to the calling fax machine to inform the calling fax machine of its capabilities. Upon detection of the DIS signal, the calling fax machine sends a digital command signal (DCS) to inform the called fax machine of the capabilities the calling fax machine plans to use.

Other messages in addition to the above described initiation signals also take place between the fax machines during a call. For example, training signals, information messages, and termination messages are also part of a typical fax call.

According to T.30, whenever a fax sends a V.21 message, it must first send a preamble having a one second duration. The preamble consists of a series of V.21 flags. The preamble is used to inform the receiver that a message is to be sent, and allows the receiver to synchronize correctly so that the actual message may be properly received.

Although necessary for synchronization, the preamble delays the message for at least one second. A tandem configuration further contributes to the delay. Both the preamble and the message must be transmitted over the PSTN link, and the additional processing delay associated with the transmission may result in an unacceptably long delay. Furthermore, the additional delay may result in a prematurely dropped call.

The delay due to the tandem configuration may also cause a message collision to occur. A message collision occurs when a message and a response are being transmitted at the same time. The T.30 fax protocol specifies the sequence and format of the messages, such as the CNG, CED, DIS, and DCS messages, that are transmitted. To accommodate unfavorable channel conditions, the T.30 protocol requires that certain unanswered messages from a source fax machine be repeated. A source fax machine may refer to either the calling or the called fax machine. After a source fax machine sends a message to the destination fax machine, the source fax machine expects a response from the destination fax machine within a specified period of time. If no response is received after the specified period of time, the source fax machine retransmits the message. The retransmissions continue until a response from the destination fax machine is received or an excessive number of attempts have been made.

According to the T.30 fax protocol, the repetition interval for a fax machine operating in automatic mode is 3.0 sec±0.45 sec. This means that a fax machine conforming to the T.30 fax protocol should not retransmit a message within 2.55 sec of the prior message. Thus, no collision will occur if such a fax machine receives a response within the shortest repetition interval of 2.55 sec.

However, long transmission delays in the communication channel can cause message collisions. In one scenario, the source fax machine sends a message to the receiving fax machine, and because of transmission delays, the destination fax machine may not respond right away. The transmission delay may be due to the extra time needed for the base station to communicate with the fax machine over-the-air. Since the source fax machine does not receive the response in time, it retransmits the message. The source fax machine will retransmit the message approximately every three seconds. In the meantime, the destination fax machine may respond. If the response from the destination fax machine arrives at the same time the source fax machine is retransmitting the message, a message collision results and the response will not be received by the source fax machine. The message collision may ultimately result in the fax machines dropping the call.

The lengthy delays and the potential for message collisions in a tandem configuration need to be addressed for fax machines to function reliably in a network involving more than just the PSTN. These problems and deficiencies are solved by the present invention in the manner described below.

SUMMARY OF THE INVENTION

The present invention is an apparatus and method for supporting analog fax calls between wireless subscriber stations in a tandem configuration. A tandem configuration arises when each wireless subscriber communicates with a base station, thus requiring processing via two base stations. In a tandem configuration, delays are incurred due to the over-the-air processing and the transmission of signals between the two base stations over the PSTN. The present invention determines the existence of a tandem configuration, and establishes a more efficient communication protocol between the two base stations upon detection of a tandem configuration.

In accordance with the present invention, a message generator in a first base station generates a message to identify itself as a base station. A non-standard facilities (NSF) message, normally used for advertising facilities specific to a fax manufacturer, may be used for this purpose. The message is transmitted, and if received by a second base station, will serve as an indication to the second base station that a tandem configuration exists. The second base station may then transmit a return message, which, when received by the first base station, will inform the first base station that a tandem configuration exists. The return message may be a non-standard facilities setup (NSS) message.

Upon detection of a tandem configuration, a faster communication protocol may be established to reduce the delays. In one embodiment, the two base stations may set up a full duplex communication channel. Generally, fax machines operate in the half duplex mode, where a fax machine is either receiving or transmitting messages, but not both. Setting up full duplex communication between two base stations would reduce the delays in the tandem configuration. Full duplex communication may be achieved by incorporating echo cancelers into the base station modems. The base stations may be set up to listen to incoming messages while also transmitting. Full duplex communication may also be achieved by utilizing alternate channels for transmission in opposite directions. Although the V.21 protocol provides for two channels, standard T.30 V.21 messages are sent only on channel 2. Full duplex communication may be achieved by allowing one base station to transmit on one channel, and allowing the second base station to transmit on the second channel.

In another embodiment, delays may be reduced by providing for advanced flag synchronization. Under the T.30 protocol, a preamble of one second is sent before each message. The preamble comprises a series of V.21 flags. According to current procedures, after a message is transmitted from a first base station to a second base station, the second base station relays the message to the fax machine, and waits for the fax machine to respond. When the fax machine responds with a reply message (preceded by a preamble), the second base station in turn transmits the reply message (preceded by a preamble) to the first base station.

The present invention recognizes that tandem delays may be reduced by having the second base station start transmitting the preamble immediately after receiving a message, rather than having the second base station wait for the response from the fax machine. Thus, if the second base station recognizes the received message and determines that a response is expected, it immediately starts transmitting V.21 flags to the first base station. Although a reply message from the fax machine is not yet available, a flag generator within the second base station generates the flags which are transmitted by the second base station. The reply message from the fax machine is relayed by the second base station when the message is available. This way, the first base station may begin synchronizing its V.21 receiver much earlier, reducing the delay. Furthermore, the first base station will not repeat transmission of its message, as required by T.30. Under T.30, a message is repeatedly transmitted until a response is received. By not repeating the message, the first base station eliminates the possibility of a collision.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
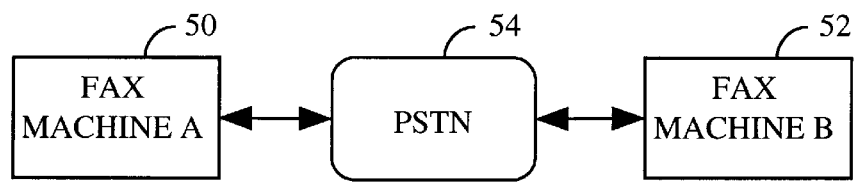
FIG. 1 is a block diagram of a typical fax communication system.

A typical fax communication system is illustrated in FIG. 1. In this fax communication system, fax machine A 50 communicates with fax machine B 52 through public switched telephone network (PSTN) 54. The communication channels connecting fax machine A 50 and fax machine B 52 with PSTN 54 are generally standard RJ-11 interfaces. The characteristics and delays of the RJ-11 interfaces and PSTN 54 are well defined and accounted for in the T.30 fax protocol.

Figure 2:
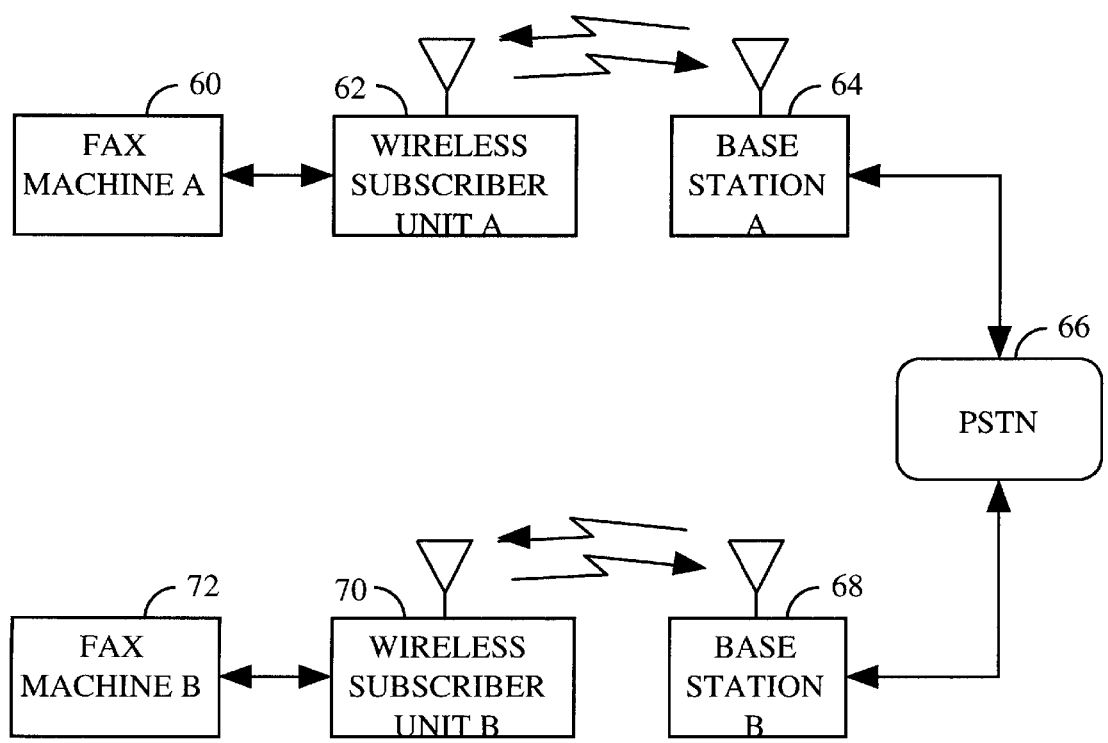
FIG. 2 is a block diagram of a fax communication system which incorporates a wireless communication system in a tandem configuration.

A wireless communication system may be incorporated into a fax communication system. An exemplary fax system which makes use of wireless communications is illustrated in FIG. 2. In FIG. 2, fax machine A 60 communicates with wireless subscriber unit A 62, typically through an RJ-11 interface. Wireless subscriber unit A 62 may be a mobile telephone or some other wireless subscriber equipment such as a Fixed Wireless Terminal (FWT). Wireless subscriber units, including mobile telephones and FWTs are often referred to as Wireless Access Subscriber Units (WASU). Wireless subscriber unit A 62 communicates with base station A 64 through an over-the-air communication channel. The over-the-air channel may be a terrestrial wireless link or a satellite link. In a wireless system, signals may be modulated in accordance with formats such as Code Division Multiple Access (CDMA), Time Division Multiple Access (TDMA), or Frequency Division Multiple Access (FDMA). In the exemplary embodiment, a CDMA modulation format is used as described in U.S. Pat. No. 4,901,307, entitled "SPREAD SPECTRUM MULTIPLE ACCESS COMMUNICATION SYSTEM USING SATELLITE OR TERRESTRIAL REPEATERS," which is assigned to the assignee of the present invention and incorporated by reference herein.

Base station A 64 is the cell site for the cell in which wireless subscriber unit A 62 is located. For purposes of the present invention, base station A 64 receives the over-the-air signal from wireless subscriber unit A 62, processes and remodulates the signal, and sends the data to PSTN 66. Base station A 64 also relays messages from PSTN 66 to wireless subscriber unit A 62. A standard T1/E1 line or any other similar transmission medium connects base station A 64 and PSTN 66.

In turn, PSTN 66 communicates with base station B 68 via a transmission medium such as a T1/E1 line. Base station B 68 is the cell site for the cell in which wireless subscriber unit B 70 is located. Base station B 68 and wireless subscriber unit B 70 communicate via an over-the-air communication channel such as a terrestrial wireless link or a satellite link. Wireless subscriber unit B 70 and fax machine B 72 are linked, typically by an RJ-11 interface.

Due to the processing between wireless subscriber unit A 62 and base station A 64; base station A 64 and base station B 68 through the PSTN 66; and wireless subscriber unit B 70 and base station B 68, degradation in performance is experienced through the introduction of errors and delays. The present invention is concerned with reducing these delays.

The configuration shown in FIG. 2 is known as a tandem configuration. In a tandem configuration, over-the-air processing and transmission delays result in performance degradation. Furthermore, fax communication protocols between base stations connected through the PSTN can introduce more delays. The present invention detects the existence of a tandem call, then uses this information to set up a faster communication protocol between the base stations.

Figure 3:
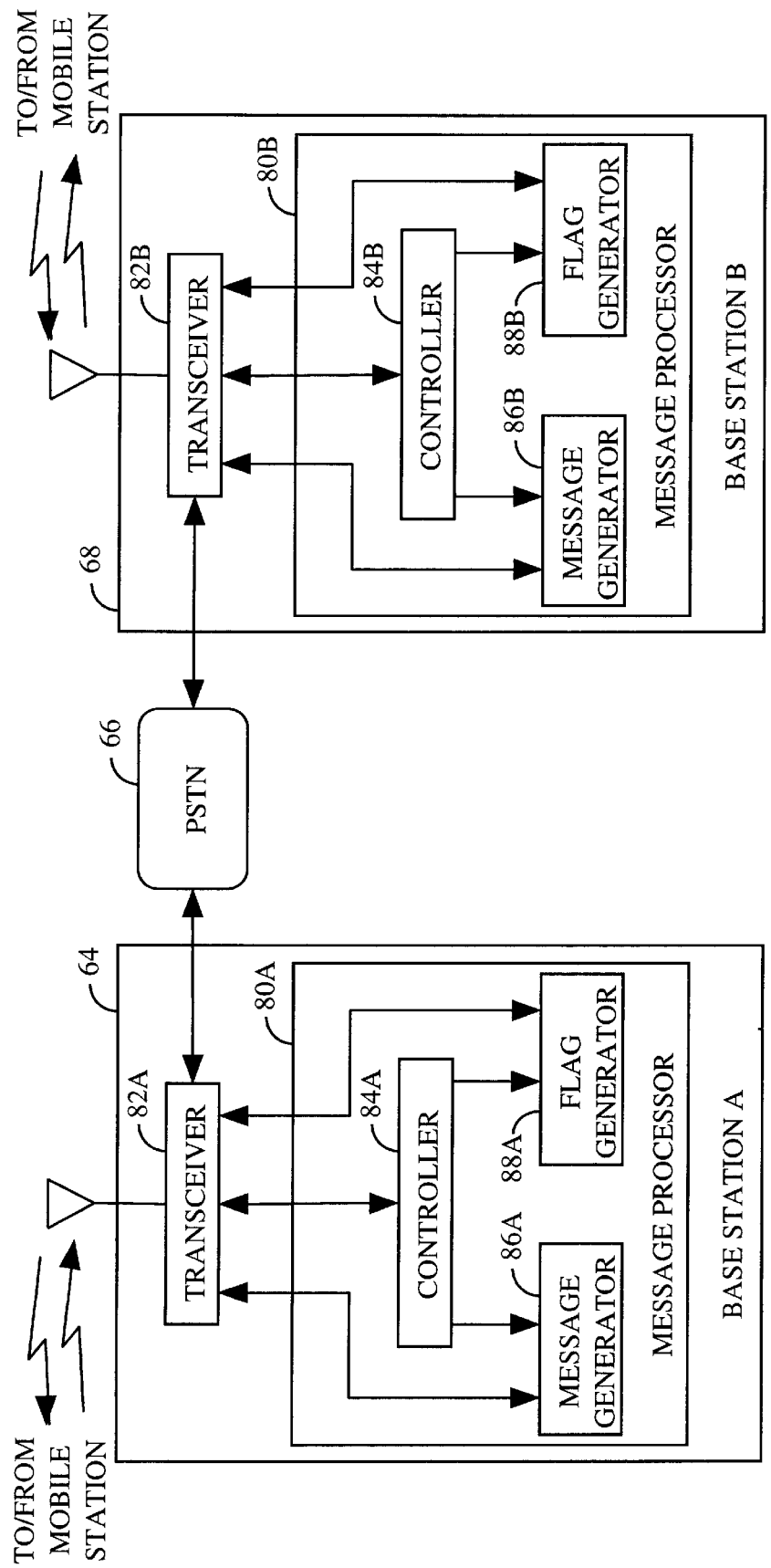
FIG. 3 is a block diagram of the processing elements in base stations for supporting fax calls in a tandem configuration.

In a preferred embodiment, the base stations detect a tandem configuration using the processing elements shown in FIG. 3. The base stations detect the tandem configuration using in-band signaling. In-band signaling refers to transmission of data and messages that are directly related to the fax call, as opposed to out-of-band signaling which relates to transmission of data and messages that are not directly related to the fax call. Referring to FIG. 3, message processors 80a and 80b determine the existence of the tandem configuration by evaluating the in-band signaling.

As discussed above, certain messages are sent between the calling and called fax machines during a fax call set up. The calling fax machine sends a CNG message to the called fax machine, which responds with a CED message. The called fax machine also sends a DIS message to the calling fax machine to identify its capabilities. In addition to the DIS, the called fax machine may send a non-standard facilities (NSF) message to the calling fax machine before sending the DIS. The NSF is a T.30 message used by fax machines to advertise non-standard facilities specific to a manufacturer. If the calling fax machine recognizes the NSF, it may respond with a non-standard facilities setup (NSS) message. If the calling fax machine does not recognize the NSF, a DCS message will be sent. The NSF and NSS messages are generally used to identify and communicate non-standard information between two fax machines of the same manufacturer to facilitate processing. When it is known that the fax machines are of the same manufacturer, special features of the fax machines may be activated.

Instead of utilizing the NSF and NSS messages to identify non-standard facilities, the present invention recognizes that these messages may be utilized by the base stations to determine the existence of a tandem configuration. Referring to FIG. 3 with reference to FIG. 2, the detection of tandem configuration will be explained with fax machine A 60 being the calling fax machine, base station A 64 being the calling base station, fax machine B 72 being the called fax machine, and base station B 68 being the called base station.

Fax machine A 60 initiates a call by sending a CNG message to fax machine B 72. Fax machine B 72 responds by sending a CED message to fax machine A 60. The messages are sent via wireless subscriber units 62 and 70, base stations 64 and 68, and PSTN 66. Fax machine B 72 then sends a DIS message, and may also send an optional NSF message. Generally, the optional NSF message is sent before the DIS message. The messages are transmitted over-the-air by wireless subscriber unit B 70 and received by base station B 68. Base station B 68 transmits a special NSF message to base station A 64 via PSTN 66 followed by the DIS message. After base station A 64 receives the special NSF message, it will recognize that it is speaking to a base station, and that a tandem condition exists. Base station A 64 may then inform base station B 68 of the tandem condition by sending a special NSS message instead of a DCS.

If a tandem configuration does not exist, the called base station will still send a special NSF through the PSTN. However, on the other side of the PSTN will be a standard fax machine, not a calling base station. In this case, the standard fax machine will not recognize the special NSF from the base station, and will not respond with a special NSS. Instead, the standard fax machine will use the capabilities advertised in the standard DIS message to select parameters for the call.

In a preferred embodiment, base stations 64 and 68 process the special NSF and special NSS messages using message processors 80a and 80b shown in FIG. 3. At base station B 68, transceiver 82b receives a DIS message that has been sent by fax machine B 72. Transceiver 82b may or may not receive an NSF message from fax machine B 72 in addition. In either case, upon recognizing that a DIS message has been received, controller 84*b* causes message generator 86*b* to generate a special NSF message. Controller 84*b* then causes transceiver 82*b* to transmit both the special NSF message generated by message generator 86*b* and the DIS message. The special NSF and DIS messages are transmitted to base station A 64 via PSTN 66.

At base station A 64, transceiver 82*a* receives the special NSF and DIS messages. Upon recognizing the special NSF message, controller 84*a* is informed that a tandem configuration exists, and will enable a faster communication protocol between the base stations. Controller 84*a* causes transceiver 82*a* to transmit the DIS message to fax machine A 60. Fax machine A 60 will then respond with a DCS message and this will be sent through wireless subscriber unit A 62 to transceiver 82*a*. Controller 84*a* then directs message generator 86*a* to use the information in the DCS message to generate an appropriate special NSS message. Controller 84*a* also directs transceiver 82*a* to transmit the special NSS message to base station B 68 via PSTN 66.

At base station B 68, transceiver 82*b* receives the special NSS message, and upon recognizing the special NSS message, controller 84*b* is informed of the tandem configuration and enables a faster communication protocol between the base stations. Controller 84*b* also directs message generator 86*b* to extract the appropriate DCS information from the special NSS message and generate a corresponding DCS message. Controller 84*b* will then direct transceiver 82*b* to send the DCS message to fax machine B 72 through wireless subscriber unit 70. The operation of flag generators 88*a* and 88*b* will be explained later.

It should be understood that the various processing blocks of the message processors 80*a* and 80*b* shown in FIG. 3 may be configured in a digital signal processor (DSP) or an application specific integrated circuit (ASIC). The description of the functionality of the present invention would enable one of ordinary skill to implement the present invention in a DSP or an ASIC without undue experimentation.

In the embodiment just described, the special NSF and special NSS messages are not used to identify non-standard facilities. Thus, the non-standard facilities functionality may be disabled when the messages are used to identify the existence of a tandem configuration. Alternatively, these messages may be configured to support both the detection of a tandem condition and the identification of non-standard facilities.

In one embodiment, the use of the special NSF and NSS messages for supporting both functions is described by still referring to FIG. 3 with reference to FIG. 2. If fax machine B 72 transmits an NSF message in addition to a DIS message to base station B 68, base station B 68 will generate a special NSF message. Controller 84*b* will cause message generator 86*b* to generate the special NSF message, which includes the original NSF message from fax machine B 72 encapsulated in the body of the special NSF message. The special NSF message will be sent by base station B 68 to base station A 64. When base station A 64 receives the special NSF message, controller 84*a* will be able to identify the tandem condition, and in addition, will recognize the manufacturer code and other manufacturer specific parameters within the encapsulated message. Message generator 86*a* of base station A 64 then extracts the encapsulated NSF information in the special message, and transceiver 82*a* transmits the extracted message to fax machine A 60 as an NSF message. Note that the extracted message is the original NSF message that was sent by fax machine B 72.

If fax machine A 60 recognizes the NSF message, it may respond with an NSS message which is relayed to base station A 64 through wireless subscriber unit A 62. Message generator 86*a* of base station A 64 will encapsulate the NSS message in a special NSS message, and the special NSS message will be sent to base station B 68. Upon receipt of the special NSS message, controller 84*b* of base station B 68 will recognize that a tandem condition exists. Additionally, message generator 86*b* of base station B 68 will extract the encapsulated NSS message, and transceiver 82*b* will relay this message to fax machine B 72 through wireless subscriber unit B 70. Wireless subscriber unit B 70 receives the NSS message and will recognize the manufacturer specific parameters within the message, thus making use of the non-standard facilities. Note that the extracted NSS message is the original NSS message sent by fax machine A 60.

In another embodiment, the functions of detecting a tandem condition and identifying non-standard facilities are both supported by sending a new message in addition to an original NSF or NSS message. Thus, after transceiver 82*b* of wireless subscriber unit B 68 receives an NSF message transmitted by fax machine B 72, message generator 86*b* of base station B 68 will generate a special NSF message which consists of a new NSF message followed by the original NSF message. The special NSF message is then sent to base station A 64. The new NSF message of the special NSF message will serve as an indication to base station A 64 that a tandem condition exists. The original NSF message, but not the new NSF message, will then transmitted to fax machine A 60.

If fax machine A 60 recognizes the special NSF message, it may respond with an NSS message, which is relayed to base station A 64. Message generator 86*a* of base station A 64 then generates a special NSS message which consists of a new NSS message followed by the original NSS message. The special NSS message is transmitted to base station B 68. Upon receipt of the new NSS message within the special message, controller 84*b* of base station B 68 will recognize that a tandem condition exists. Further, the original NSS message will be transmitted to fax machine B 72, and fax machine B 72 will recognize the manufacturer specific parameters within the original NSS message. In this fashion, the non-standard facilities functionality is preserved while the special NSF and special NSS messages are also used to identify the existence of a tandem condition.

Figure 4:
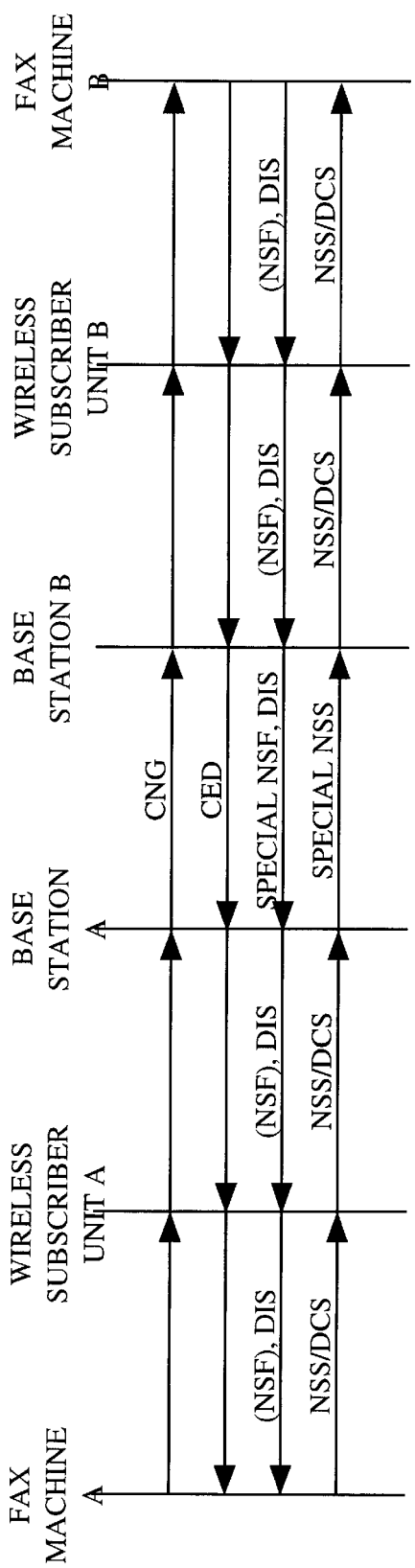
FIG. 4 is a flow diagram illustrating messages which are transmitted between fax machines and base stations for detection of a tandem configuration.

Referring now to FIG. 4 with reference to FIG. 2, a flow diagram is shown illustrating the messages which are utilized for determining the presence of a tandem configuration. The messages are transmitted between fax machine A 60 (the calling fax machine), wireless subscriber unit A 62, base station A 64, base station B 68, wireless subscriber unit B 70, and fax machine B 72 (the called fax machine). A CNG message is sent from fax machine A 60 to fax machine B 72 via wireless subscriber unit A 62, base station A 64, base station B 68, and wireless subscriber unit B 70. In reply, a CED message is sent from fax machine B 72 to fax machine A 60 via wireless subscriber unit B 70, base station B 68, base station A 64, and wireless subscriber unit A 62.

Fax machine B 72 also sends a DIS message, and may or may not send an NSF message. The optional NSF message is denoted by the label "(NSF)" in FIG. 4. The optional NSF message and the DIS message are received at base station B 68. The DIS message is transmitted to base station A 64. In addition, a special NSF message is transmitted to base station A 64 whether or not an NSF message is received at base station B 68. The special NSF message may incorporate the original NSF message transmitted from fax machine B 72. The special NSF message indicates to base station A 64 that a tandem condition exists.

After receiving the special NSF and the DIS messages at base station A 64, the original NSF message is extracted if one had been incorporated, into the special NSF message. The extracted NSF message and the DIS message are then sent to fax machine A 60 via wireless subscriber unit A 62. If an original NSF message had not been incorporated into the special NSF message, only the DIS message will be transmitted to fax machine A 60 via wireless subscriber unit A 62.

In response to the DIS message, fax machine A 60 will transmit a DCS or an NSS message, as denoted by the label "NSS/DCS" in FIG. 4. If a DCS message, but not an NSS message, is sent from fax machine A 60 to base station A 64, base station A 64 incorporates this DCS information into a special NSS message and transmits the special message to base station B 68. The special NSS message indicates to base station B 68 that a tandem condition exists. When base station B 68 receives the special NSS message, it extracts the incorporated DCS information and sends the corresponding DCS message to fax machine B 72.

If an NSS message is sent from fax machine A 60, base station A 64 will also transmit a special NSS message to base station B 68. The special NSS message may incorporate the original NSS information. The special NSS message indicates to base station B 68 that a tandem condition exists. When base station B 68 receives the special NSS message, it extracts the original NSS information, and sends the extracted NSS message to fax machine B 72.

Although the detection of a tandem condition has been described to make use of the NSF and NSS messages, one skilled in the art will recognize that other messages with similar characteristics may also be used for detecting the tandem condition. Other embodiments may use special tones to indicate a tandem condition. For instance, base station B 68 may send a special tone that does not interfere with the standard V.21 signals. Base station A 64 will use a special detector that operates in parallel with the standard V.21 demodulator to detect this special tone and thus identify the tandem condition.

Once a tandem call is detected, two base stations may establish a more efficient communication protocol. For example, the base stations may communicate more efficiently by setting up a full duplex link. Generally, fax machines operate in the half duplex mode, wherein messages may be either transmitted or received, but not both, at any particular instant. Thus, fax machines must wait their turns before sending messages between each other. Although this is a simple protocol, it is relatively slow since it often involves waiting for a clear channel. By setting up full duplex communication, messages may be exchanged between the base stations without waiting, and the delay due to the tandem configuration may be reduced.

Figure 5:
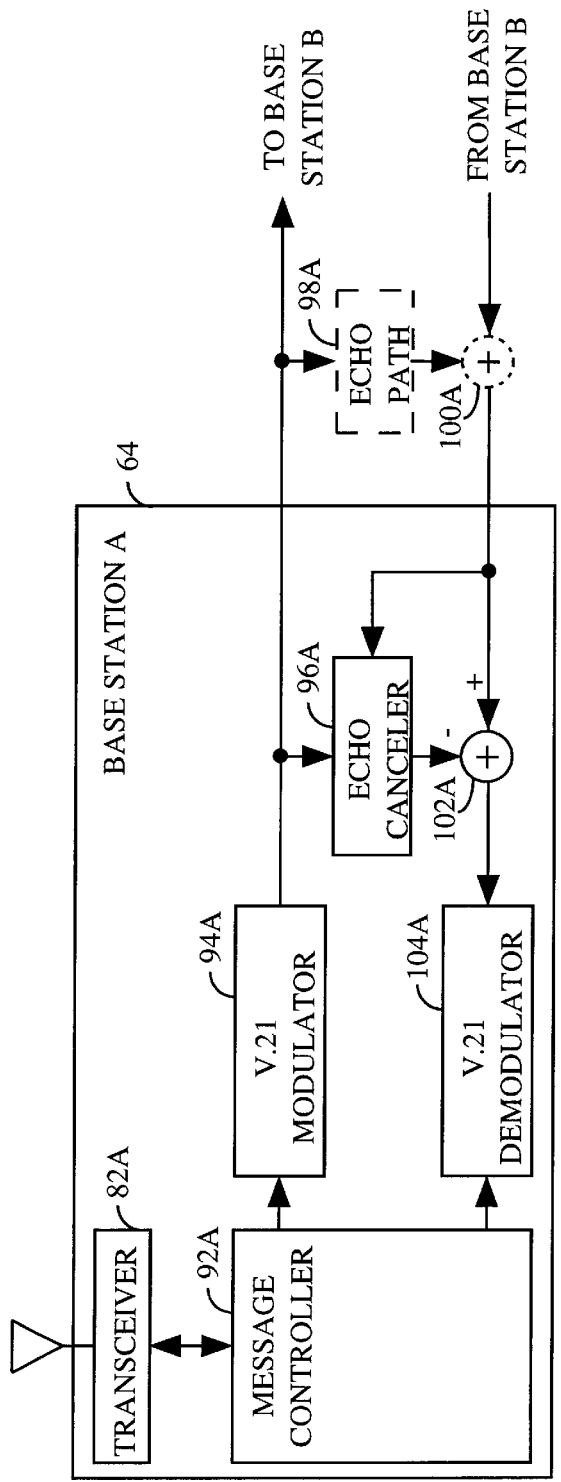
FIG. 5 is a block diagram illustrating the processing elements for establishing full duplex communication utilizing an echo canceler.

In one embodiment, full duplex communication may be achieved using echo cancelers in the base stations. This is similar to how full duplex data modems work. The use of echo cancelers to implement full duplex communication is illustrated in FIG. 5. In FIG. 5, the echo cancellation system is illustrated to be an included element of base station A 64. It should be understood that base station B 68 comprises a similar echo cancellation system.

Referring to FIG. 5 with reference to FIG. 2, a message from wireless subscriber unit A 62 is received at transceiver 82a, and sent to message controller 92a. Message controller 92a relays the message to V.21 modulator 94a, which modulates the message in accordance with the V.21 standard for transmission through PSTN 66 to base station B 68. The modulated message is also provided to echo canceler 96a. Because PSTN 66 is an imperfect channel, a signal transmitted from V.21 modulator 96a is passed through echo path 98a, and an echo of the signal may be transmitted back into base station A 64. If a signal is also being transmitted from base station B 68, the echo will be summed with the signal from base station B 68 at summer 100a, producing a combined signal. The combined signal is received at base station A 64. It should be understood that echo path 98a and summer 100a are not included elements of the communication system, but are artifacts of the system and are illustrated for reference purposes only.

The combined signal, received at base station A 64, is provided to echo canceler 96a and summer 102a. Echo canceler 96a subtracts echoes of the V.21 signal from the combined signal. Using adaptive filtering techniques, echo canceler 96a generates an estimate of the echo, and provides the estimate to summer 102a. At summer 102a, the echo estimate is subtracted from the received signal to provide an echo canceled signal. An exemplary form of echo canceler 96a is disclosed in U.S. Pat. No. 5,307,405, entitled "NETWORK ECHO CANCELLER", which is assigned to the assignee of the present invention and incorporated by reference herein.

The echo canceled signal is provided to V.21 demodulator 104a. V.21 demodulator 104a demodulates the echo canceled signal into data bits, and the demodulated signal is provided to message controller 92a. Message controller 92a provides the signal to transceiver 82a, which transmits the signal to wireless subscriber unit A 62.

By incorporating echo canceler 96a in base station A 64, V.21 modulator 94a may send signals while V.21 demodulator 104a receives signals. Without echo canceler 96a, full duplex communication is not possible because echoes from signals transmitted from V.21 modulator 94a will corrupt signals received by V.21 demodulator 104a. By incorporating echo canceler 96a, echoes of signals transmitted from V.21 modulator 94a are canceled, allowing V.21 demodulator 104a to listen to the signals from base station B 68 without the distortion from echoes. The echo canceler in base station B 68 operates in a similar manner. Hence, both base station A 64 and base station B 68 are able to send messages to each other simultaneously without message collisions, reducing message delays.

In another embodiment, full duplex communication is realized by making use of alternate channels for transmission in opposite directions. The V.21 fax protocol has provided for two binary frequency shift keying (BFSK) channels, channels 1 and 2. For each channel, the transmitter uses one frequency to signal a binary '0' and another frequency to signal a binary '1'. Although two channels are provided for, standard T.30 V.21 messages are sent on channel 2, leaving channel 1 unused. The two channels can be used simultaneously as long as the receivers are properly tuned to the correct frequencies.

Figure 6:
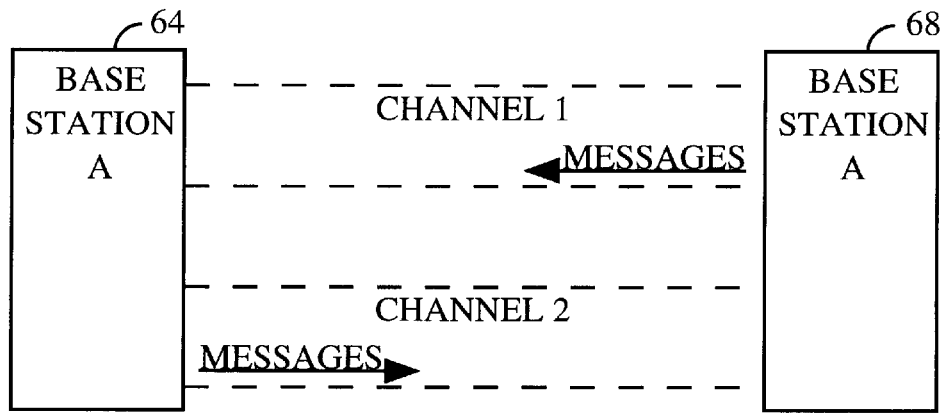
FIG. 6 is a diagram illustrating the utilization of two BFSK channels in establishing full duplex communication.

In an exemplary scenario, both base stations (base station A 64 and base station B 68 of FIG. 2) start communications on the conventional V.21 channel, channel 2. When the called base station receives the NSS, it will recognize that a tandem configuration exists. Furthermore, it will interpret the NSS message as an indication that the calling base station is capable of receiving on channel 1. Henceforth, the called base station will send out messages on channel 1 and listen for incoming messages on channel 2. The calling base station will do the opposite. FIG. 6 illustrates the scenario wherein the calling base station (base station A 64) and the called base station (base station B 68) communicate using both channel 1 and channel 2. Since the messages sent on the different channels will not interfere with each other, the base stations are able to send messages without waiting, thus reducing the delay in the tandem configuration.

After establishing the existence of a tandem configuration, two base stations may also reduce delays by advanced flag synchronization. As previously discussed, the T.30 protocol requires that a one second preamble is sent before an actual message is sent. The preamble consists of a series of V.21 flags. A V.21 flag is a byte whose value is 0×7E. Upon receipt of the flags, the receiving fax is informed that a message is to follow, and synchronizes accordingly so that the message may be properly received.

The problem with the preamble is that it delays the message. The actual message data comes at least a second later. Further delays arise due to the over-the-air processing and transmission in a tandem configuration. In addition, a collision may occur. If the transmitting base station does not receive a response from the receiving base station within 3.0 seconds, the transmitting base station will resend the message every 3.0 seconds. In the meantime, the receiving base station may respond. Since fax machines operate in a half duplex mode, a message collision may occur.

The present invention serves to reduce the delay due to the tandem configuration and also to reduce the possibility of collision due to the delay. Referring back to FIG. 3 with reference to FIG. 2, the base stations may perform advanced flag synchronization to solve the problems of delay and collision. Assume that the existence of a tandem configuration has already been established. Further, assume that fax machine A 60 is sending a message to fax machine B 72. The message is transmitted from fax machine A 60 to base station A 64, which then sends the message to base station B 68. The message is transmitted via PSTN 66. After the message is received at base station B 68, if controller 84b recognizes the message and determines that base station A 64 is expecting a response, controller 84b causes flag generator 88b to immediately start generating V.21 flags. Controller 84b also causes transceiver 82b to immediately start sending these V.21 flags to base station A 64. Base station B 68 does not yet have an actual response from fax machine B 72, but starts sending the flags anyway.

Sending the flags immediately after receipt of the message serves two purposes. First, base station A 64 is informed that base station B 68 has received the last message correctly, and therefore base station A 64 should not repeat the message as required by T.30, thus avoiding a potential collision condition. Second, base station A 64 may start synchronizing its V.21 receiver as soon as the flags are received, greatly reducing the delay. Base station A 64 should also not time-out on excessive V.21 flags as is required in the standard T.30 fax protocol. Now, when base station B 68 has received a response from fax machine B 72, base station B 72 can send the message to base station A 64 without incurring the one second flag delay. Base station B 68 may send the response right away since it is aware that base station A 64 will be expecting the response, and that base station A 64 has already synchronized its receiver.

Figure 7:
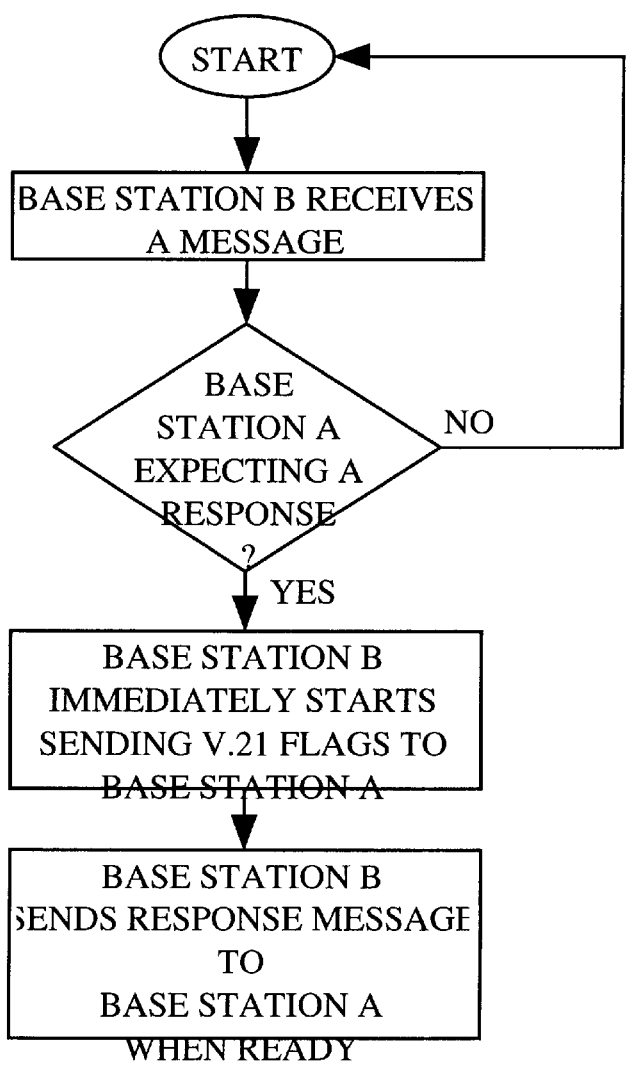
FIG. 7 is a flow diagram illustrating some of the steps involved in advanced flag synchronization for support of a tandem configuration.

Referring now to FIG. 7, a flow diagram is shown illustrating some of the processing steps undertaken by base station B 68 after receipt of a message. The steps illustrated in FIG. 7 are performed by the processing elements of base station B 68 as described above with reference to FIG. 3.

It should be understood that flag generator 88a of base station A 64 performs the same function as flag generator 88b of base station B 68. Thus, upon receipt by transceiver 82a of a message, if controller 84a recognizes the message and determines that base station B 68 is expecting a response, controller 84a causes flag generator 88a to immediately start generating V.21 flags. Controller 84a also causes transceiver 82a to immediately start sending these V.21 flags to base station B 68. By sending the flags right away, the present invention reduces the delays and the possibility of collisions due to a tandem configuration.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. An apparatus in a base station for establishing advanced flag synchronization with another base station, said apparatus activated upon determining that a tandem configuration is present in a fax communication system, comprising:

a transceiver for receiving an incoming message from said another base station;

a controller for analyzing said incoming message to determine if said another base station is expecting a response message for said incoming message;

a flag generator for generating a preamble composed of a series of flags for immediate transmission to said another base station upon determination by said controller that said another base station is expecting a response message, wherein each of said flags is a V.21 flag; and a message generator for generating a response message for transmission to said another base station.

2. The apparatus of claim 1 wherein said V.21 flag is a byte whose value is 0×7E.

3. A method for facilitating communication by a base station in a fax communication system, comprising the steps of:

determining, at said base station, the existence of a tandem configuration; and establishing advanced flag synchronization with another base station upon determining that said tandem configuration exists wherein said step of establishing advanced flag synchronization comprises the steps of:

receiving an incoming message from said another base station;

analyzing said incoming message to determine if said another base station is expecting a response message for said incoming message;

generating a preamble composed of a series of flags for immediate transmission to said another base station when said step of analyzing determines that said another base station is expecting a response message, wherein each of said flags is a V.21 flag; and generating a response message for transmission to said another base station.

4. The method of claim 3 wherein said V.21 flag is a byte whose value is 0×7E.

* * * * *